United States Patent [19]
Yamada

[11] Patent Number: 5,937,111
[45] Date of Patent: Aug. 10, 1999

[54] IMAGE PROCESSING METHOD AND APPARATUS

[75] Inventor: Masahiko Yamada, Kanagawa-ken, Japan

[73] Assignee: Fuji Photo Film Co., Ltd., Kanagawa-ken, Japan

[21] Appl. No.: 08/818,039

[22] Filed: Mar. 14, 1997

[30] Foreign Application Priority Data

Mar. 15, 1996 [JP] Japan ..................................... 8-058789

[51] Int. Cl.$^6$ ....................................................... G06K 9/56
[52] U.S. Cl. ........................................... 382/308; 382/132
[58] Field of Search ..................................... 382/308, 131, 382/132, 128, 260, 261, 264; 128/922

[56] References Cited

U.S. PATENT DOCUMENTS

| | | | |
|---|---|---|---|
| 4,315,318 | 2/1982 | Kato et al. ............................... | 382/264 |
| 4,571,635 | 2/1986 | Mahmoodi et al. ..................... | 358/284 |
| 4,794,531 | 12/1988 | Morishita et al. ....................... | 382/132 |
| 5,761,334 | 6/1998 | Nakajima et al. ....................... | 382/132 |

FOREIGN PATENT DOCUMENTS

| | | | |
|---|---|---|---|
| 0 153 167 | 8/1985 | European Pat. Off. ........ | G06F 15/68 |
| 0 182 423 | 5/1986 | European Pat. Off. ........ | H04N 1/40 |
| 0 357 842 A1 | 9/1988 | European Pat. Off. ........ | G06F 15/68 |
| WO 90/07751 | 7/1990 | WIPO ............................. | G06F 15/68 |

OTHER PUBLICATIONS

"Extraction of Small Microcalcifications on Mammogram Using Morphological Filter with Multiple Structuring Elements" vol. J75–D–11, No. 7, pp. 1170–1176, 1992.

"Basic Theory of Mathematical Morphology and its Appication to Mammogram Processing", vol. 12, No. 1 Jan. 1994.

*Primary Examiner*—Jon Chang
*Assistant Examiner*—Vikkram Bali
*Attorney, Agent, or Firm*—Sughrue, Mion, Zinn, Macpeak & Seas, PLLC

[57] ABSTRACT

A morphology operation, with which an image portion having a contour of a predetermined size is extracted from an original image, is carried out on an original image signal Sorg representing the original image. A specific image signal, which represents a characteristic value with respect to the image portion having the contour, is thereby obtained. A specific image emphasis coefficient in accordance with the level of the specific image signal is calculated. An edge signal, which represents a characteristic value with respect to an image edge portion in the original image, is detected. The specific image emphasis coefficient is adjusted in accordance with the edge signal. A new specific image emphasis coefficient obtained from the adjustment is employed as an emphasis coefficient β, and a processed image signal Sproc is calculated with Formula (1):

$$Sproc = Sorg + \beta \times (Sorg - Sus) \quad (1)$$

where Sus represents an unsharp mask signal of the original image signal Sorg.

14 Claims, 10 Drawing Sheets

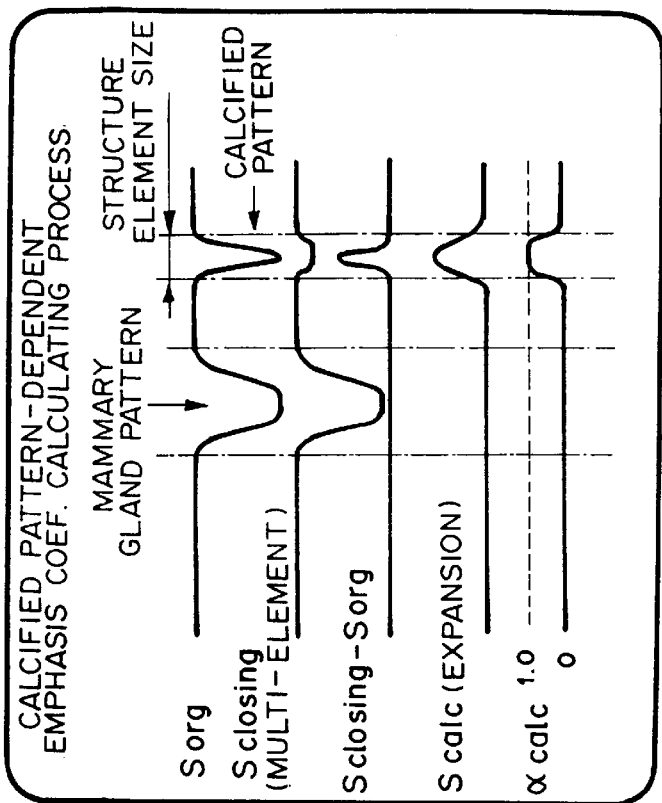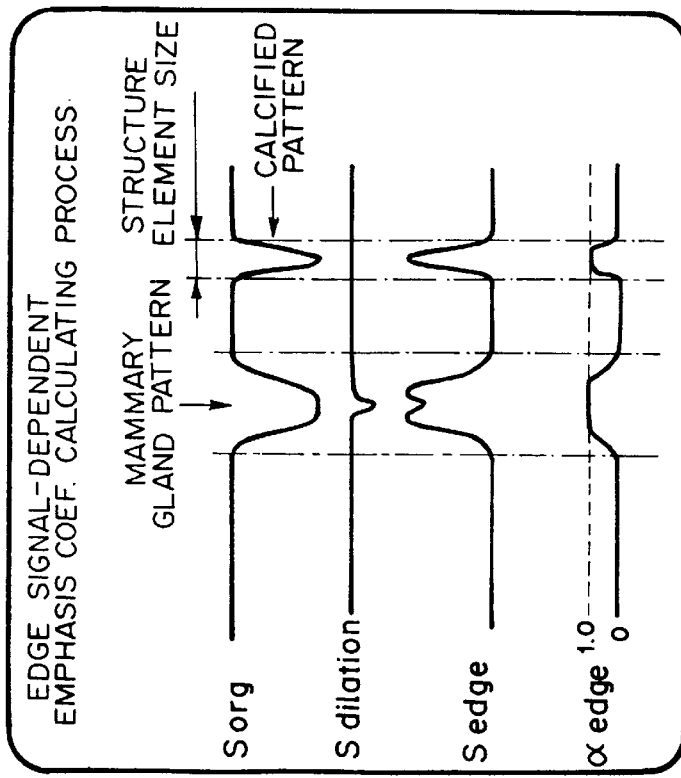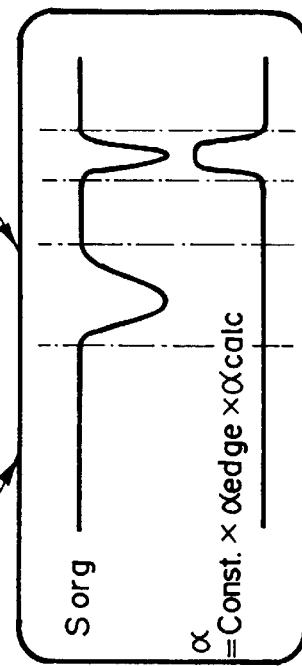

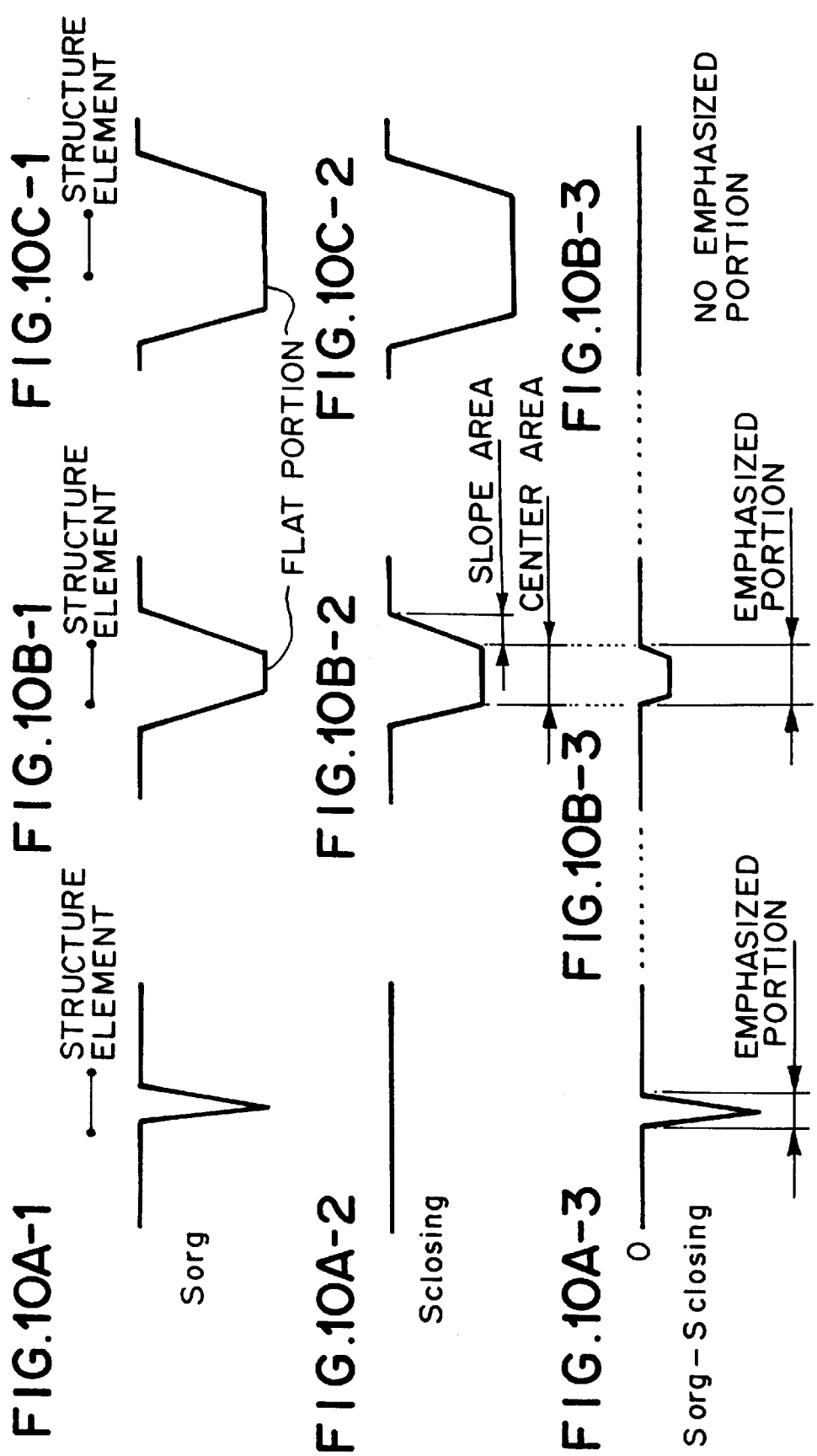

IMAGE PROCESSING METHOD AND APPARATUS

BACKGROUND OF THE INVENTION

1. Field of the Invention

This invention relates to an image processing method and apparatus. This invention particularly relates to an improvement in an image processing method and apparatus, wherein only a specific image portion, such as an abnormal pattern, which is embedded in an image, is extracted from the image and emphasized selectively.

2. Description of the Prior Art

Image processing, such as gradation processing or frequency processing, has heretofore been carried out on an image signal (i.e., an original image signal), which represents an original image having been obtained with one of various image obtaining methods, such that a visible image having good image quality can be reproduced and used as an effective tool in, particularly, the accurate and efficient diagnosis of an illness. Particularly, in the field of medical images, such as radiation images of human bodies serving as objects, it is necessary for specialists, such as doctors, to make an accurate diagnosis of an illness or an injury of the patient in accordance with the obtained image. Therefore, it is essential to carry out the image processing in order that a visible image having good image quality can be reproduced and used as an effective tool in the accurate and efficient diagnosis of an illness.

As one of the image processing, frequency emphasis processing has been disclosed in, for example, Japanese Unexamined Patent Publication No. 61(1986)-169971. With the disclosed frequency emphasis processing, an original image signal Sorg, which may represent the image density value, or the like, of an original image is converted into a processed image signal Sproc with Formula (1) shown below.

$$Sproc = Sorg + \beta \times (Sorg - Sus) \quad (1)$$

In Formula (1), $\beta$ represents the frequency emphasis coefficient, and Sus represents the unsharp mask signal. The unsharp mask signal Sus comprises super-low frequency components obtained by setting a mask, i.e. an unsharp mask, constituted of a picture element matrix, which has a size of N columns×N rows (wherein N represents an odd number) and has its center at the picture element represented by the original image signal Sorg, in a two-dimensional array of picture elements of the image. The unsharp mask signal Sus is calculated with, for example, Formula (2) shown below.

$$Sus = (\Sigma\Sigma Sorg)/N^2 \quad (2)$$

wherein $\Sigma\Sigma Sorg$ represents the sum of the image signal values representing the picture elements located within the unsharp mask.

The value of (Sorg−Sus) in the parenthesis of the second term of Formula (1) is obtained by subtracting the unsharp mask signal Sus, which represents the super-low frequency components, from the original image signal Sorg. Therefore, the value of (Sorg−Sus) represents the comparatively high frequency components, which have been extracted selectively by eliminating the super-low frequency components from the original image signal Sorg.

The comparatively high frequency components are then multiplied by the frequency emphasis coefficient $\beta$, and the obtained product is added to the original image signal Sorg. In this manner, of the original image, only the comparatively high frequency components can be selectively and relatively subjected to emphasis or restriction (adjustment of sharpness).

Also, processing based upon the algorithm of morphology (hereinbelow referred to as the morphology operation or the morphology processing) has heretofore been known as the operation processing for selectively extracting only a specific image portion, such as an abnormal pattern, or an image edge portion from an original image.

The morphology processing has been studied as a technique efficient for detecting, particularly, a small calcified pattern, which is one of characteristic forms of mammary cancers. However, the image to be processed with the morphology processing is not limited to the small calcified pattern in a mammogram, and the morphology processing is applicable to any kind of image, in which the size and the shape of a specific image portion (i.e., an abnormal pattern, or the like) to be detected are known previously.

The morphology processing is carried out by using a structure element (also referred to as a mask) B, which is set in accordance with the size of the image portion to be extracted, and a multi-scale $\lambda$. The morphology processing has the features in that, for example, (1) it is efficient for extracting a calcified pattern itself, (2) it is not affected by complicated background information, and (3) the extracted calcified pattern does not become distorted.

Specifically, the morphology processing is advantageous over ordinary differentiation processing in that it can more accurately detect the geometrical information concerning the size, the shape, and the image density distribution of the calcified pattern. How the morphology processing is carried out will be described hereinbelow by taking the detection of a small calcified pattern in a mammogram as an example.

Fundamental operation of morphology processing

In general, the morphology processing is expanded as the theory of sets in an N-dimensional space. As an aid in facilitating the intuitive understanding, the morphology processing will be described hereinbelow with reference to a two-dimensional gray level image.

The gray level image is considered as a space, in which a point having coordinates (x, y) has a height corresponding to an image density value f(x, y). In this case, it is assumed that the image signal representing the image density value f(x, y) is a high luminance-high signal level type of image signal, in which a low image density (i.e., a high luminance when the image is displayed on a CRT display device) is represented by a high image signal level.

Firstly, as an aid in facilitating the explanation, a one-dimensional function f(x) corresponding to the cross-section of the two-dimensional gray level image is considered. It is assumed that a structure element g (corresponding to the aforesaid structure element B) used in the morphology operation is a symmetric function of Formula (3) shown below, which is symmetric with respect to the origin.

$$g^s(x) = g(-x) \quad (3)$$

It is also assumed that the value is 0 in a domain of definition G, which is represented by Formula (4).

$$G = \{-m, -m+1, \ldots, -1, 0, 1, \ldots, m-1, m\} \quad (4)$$

In such cases, the fundamental forms of the morphology operation are very simple operations carried out with Formulas (5), (6), (7), and (8) shown below.

dilation; $[f \oplus G^s](i) = \max\{f(i-m), \ldots, f(i), \ldots, f(i+m)\}$ (5)

erosion; $[f \ominus G^s](i) = \min\{f(i-m), \ldots, f(i), \ldots, f(i+m)\}$ (6)

$$\text{opening; } f_g = (f \ominus g^s) \oplus g \quad (7)$$

$$\text{closing; } f^g = (f \oplus g^s) \ominus g \quad (8)$$

Specifically, as illustrated in FIG. 8A, the dilation processing is the processing for retrieving the maximum value in the region of a width of ±m (which width is the value determined in accordance with the structure element B and corresponds to the mask size shown in FIG. 8A) having its center at a picture element of interest. As illustrated in FIG. 8B, the erosion processing is the processing for retrieving the minimum value in the region of the width of ±m having its center at the picture element of interest. Therefore, the dilation processing is also referred to as the maximum value processing, and the erosion processing is also referred to as the minimum value processing.

The opening processing is equivalent to the processing in which the dilation processing is carried out after the erosion processing, i.e., the processing in which the maximum value is searched after the searching of the minimum value. Also, the closing processing is equivalent to the processing in which the erosion processing is carried out after the dilation processing, i.e., the processing in which the minimum value is searched after the searching of the maximum value.

More specifically, as illustrated in FIG. 8C, the opening processing is equivalent to the processing for smoothing the image density curve f(x) from the low luminance side, and removing a convex image density fluctuating portion (i.e., the portion at which the luminance is higher than that of the surrounding portions), which fluctuates in a region spatially narrower than the mask size of 2 m. Also, as illustrated in FIG. 8D, the closing processing is equivalent to the processing for smoothing the image density curve f(x) from the high luminance side, and removing a concave image density fluctuating portion (i.e., the portion at which the luminance is lower than that of the surrounding portions) which fluctuates in the region spatially narrower than the mask size of 2 m.

In cases where the structure element g is not symmetric with respect to the origin, the dilation operation with Formula (5) is referred to as the Minkowski sum, and the erosion operation with Formula (6) is referred to as the Minkowski difference.

In cases where the image signal representing the image density value f(x) is a high image density-high signal level type of image signal, in which a high image density is represented by a high image signal level, the relationship between the image density value f(x) and the image signal value becomes reverse to the relationship between the image density value f(x) and the image signal value in the high luminance-high image signal level type of image signal. Therefore, the dilation processing, which is carried out on the high image density-high signal level type of image signal, coincides with the erosion processing, which is carried out on the high luminance-high signal level type of image signal as shown in FIG. 8B. The erosion processing, which is carried out on the high image density-high signal level type of image signal, coincides with the dilation processing, which is carried out on the high luminance-high signal level type of image signal as shown in FIG. 8A. The opening processing, which is carried out on the high image density-high signal level type of image signal, coincides with the closing processing, which is carried out on the high luminance-high signal level type of image signal as shown in FIG. 8D. Also, the closing processing, which is carried out on the high image density-high signal level type of image signal, coincides with the opening processing, which is carried out on the high luminance-high signal level type of image signal as shown in FIG. 8C.

The morphology processing is herein described with respect to the high luminance-high signal level type of image signal.

Application to detection of calcified patterns

In order for a calcified pattern to be detected, it is considered to employ a difference method, in which a smoothed image signal is subtracted from the original image signal. However, with a simple smoothing method, it is difficult to discriminate the calcified pattern from an elongated non-calcified pattern (for example, a pattern of the mammary gland, a blood vessel, mammary gland supporting tissues, or the like). Therefore, Obata of Tokyo University of Agriculture and Technology, et al. have proposed a morphology filter, which is represented by Formula (9) and is based upon the opening operation using a multiply structure element. [Reference should be made to "Extraction of Small Calcified Patterns with A Morphology Filter Using A Multiply Structure Element," Collected Papers of The Institute of Electronics and Communication Engineers of Japan, D-II, Vol. J75-D-II, No. 7, pp. 1170–1176, July 1992; and "Fundamentals of Morphology and Its Application to Mammogram Processing," Medical Imaging Technology, Vol. 12, No. 1, January 1994.]

$$P = \text{f-max}_{i \in (1, \ldots, M)} \{(f \ominus Bi) \oplus Bi\}$$
$$= \text{f-max}_{i \in (1, \ldots, M)} \{f_{Bi}\} \quad (9)$$

In Formula (9), Bi (wherein i=1, 2, ..., M) represents M number of linear structure elements (M=4 in the example shown in FIG. 9). (The M number of structure elements, as a whole, will hereinbelow be referred to as the multiply structure element.) In cases where the structure element Bi is set to be larger than the calcified pattern to be detected, a calcified pattern, which is a convex signal change portion finer than the structure element Bi (i.e., which is an image portion fluctuating in a spatially narrow region) and has luminance values larger than the luminance values of the surrounding portions, is removed in the opening processing. On the other hand, an elongated non-calcified pattern is longer than the structure element Bi. Therefore, in cases where the inclination of the non-calcified pattern (i.e, the direction along which the non-calcified pattern extends) coincides with one of the directions of the four structure elements Bi, the non-calcified pattern remains unremoved after the opening processing, i.e. the operation of the second term of Formula (9), has been carried out. Therefore, when the smoothed image signal obtained from the opening processing (i.e. the signal representing the image, from which only the calcified pattern has been removed) is subtracted from the original image signal f, an image can be obtained which contains only the small calcified pattern. This is the concept behind Formula (9).

As described above, in cases where the image signal is of the high image density-high signal level type, the image density value of the calcified pattern is smaller than the image density values of the surrounding image portions, and the calcified pattern constitutes a concave signal change portion with respect to the surrounding portions. Therefore, the closing processing is applied in lieu of the opening processing, and Formula (10) shown below is applied in lieu of Formula (9).

$$P = \text{f-min } \{(f \oplus Bi) \ominus Bi\}$$
$$i \in (1, \ldots, M)$$
$$= \text{f-min } \{f_{Bi}\}$$
$$i \in (1, \ldots, M) \quad (10)$$

Also, in cases where the image signal obtained from the dilation processing or the erosion processing is subtracted from the original image signal in accordance with Formula (11) or (12) shown below, only the edge portion in the original image (i.e., the hatched portion in FIGS. 8A or 8B) can be extracted selectively.

$$P=f-(f \oplus Bi) \quad (11)$$

$$P=f-(f \ominus Bi) \quad (12)$$

As described above, in order that a visible image having good image quality can be reproduced and used as an effective tool in, particularly, the accurate and efficient diagnosis of an illness, it is essential to carry out the image processing on the given image. However, in cases where the emphasis processing merely depending on the image density is carried out as disclosed in, for example, U.S. Pat. No. 4,315,318, components adversely affecting the image quality, such as radiation noise components in a mammogram, are also emphasized. As a result, the image quality of the image and its capability of serving as an effective tool in, particularly, the efficient and accurate diagnosis of an illness become low.

Also, as disclosed in, for example, U.S. Pat. No. 4,571, 635, EP 357842 B1, and EP 406382 B1, in cases where emphasis processing depending upon the value of variance of an image signal is carried out, an image portion having a locally large change in image density is emphasized to a high extent. Therefore, the problems occur in that undershooting and overshooting become relatively perceptible in the vicinity of the image portion. Particularly, as for X-ray images, an artifact is apt to occur on the high image density side.

Accordingly, the applicant proposed image processing methods, wherein emphasis depending upon the morphology signal obtained from each morphology operation described above is carried out, wherein components unnecessary for a diagnosis, or the like, such as noise components, are not emphasized, and wherein only a specific image portion of interest is emphasized efficiently. The proposed image processing methods are described in U.S. Ser. No. 08/623,223.

With the proposed image processing methods, only the calcified pattern having a size smaller than the structure element can be selectively extracted as the image portion of interest. Therefore, in cases where the emphasis processing depending upon the signal representing the extracted image portion is carried out, it is possible to obtain good effects of efficiently emphasizing only the calcified pattern, which effects could not be obtained in the past.

However, with the proposed image processing methods, it rarely occurs that an unnatural emphasized image is obtained.

FIGS. 10A-1, 10A-2, and 10A-3 are explanatory views showing how the results of processing are obtained from the processing carried out on an original image signal representing a calcified pattern smaller than a structure element. FIGS. 10B-1, 10B-2, and 10B-3 are explanatory views showing how the results of processing are obtained from the processing carried out on an original image signal representing an image pattern, that is larger than a structure element and contains a flat portion, at which the fluctuation in the signal value is comparatively small and which has a size smaller than the structure element. FIGS. 10C-1, 10C-2, and 10C-3 are explanatory views showing how the results of processing are obtained from the processing carried out on an original image signal representing an image pattern, that is larger than a structure element and contains a flat portion, at which the fluctuation in the signal value is comparatively small and which has a size sufficiently larger than the structure element.

Specifically, as illustrated in FIG. 10A-2, in cases where the closing processing is carried out as the morphology operation on the original image signal shown in FIG. 10A-1, which represents the calcified pattern smaller than the structure element, the profile of the original image signal is smoothed completely. Also, as illustrated in FIG. 10C-2, in cases where the closing processing is carried out on the original image signal of FIG. 10C-1 representing the image pattern, that is larger than the structure element and contains the flat portion, at which the fluctuation in the signal value is comparatively small and which has a size sufficiently larger than the structure element, the profile of the original image signal is kept unchanged. Therefore, as for the calcified pattern smaller than the structure element, as illustrated in FIG. 10A-3, when the signal obtained from the closing operation is subtracted from the original image signal, a signal having signal values other than 0 is obtained. On the other hand, as for the image pattern, that is larger than the structure element and contains the flat portion, at which the fluctuation in the signal value is comparatively small and which has a size sufficiently larger than the structure element, when the signal obtained from the closing operation is subtracted from the original image signal, a signal having a signal value of 0 is obtained. Accordingly, the calcified pattern of FIG. 10A-1 and the image pattern of FIG. 10C-1 can be discriminated from each other.

However, as illustrated in FIG. 10B-2, in cases where the closing processing is carried out on the original image signal of FIG. 10B-1 representing the image pattern, that is larger than the structure element and contains the flat portion, at which the fluctuation in the signal value is comparatively small and which has a size smaller than the structure element, the portion at which the signal value fluctuates in the region smaller than the structure element (i.e., the portion corresponding to the center area of the image pattern) is smoothed as in the calcified pattern of FIG. 10A-1 smaller than the structure element. Therefore, as illustrated in FIG. 10B-3, when the signal obtained from the closing operation is subtracted from the original image signal, the signal value becomes equal to 0 at the part corresponding to the slope area, which surrounds the center area in the image pattern, and signal values other than 0 are obtained at the part corresponding to the center area, which is located on the side inward from the slope area in the image pattern. As a result, as for the image pattern shown in FIG. 10B-1, only the region, which contains the center area of the image pattern and is smaller than the structure element, is emphasized.

SUMMARY OF THE INVENTION

The primary object of the present invention is to provide an image processing method, wherein the accuracy, with which a specific image portion to be selectively emphasized, such as a calcified pattern, is separated from the other image portions, is kept high, and wherein unnatural emphasis is prevented from being carried out.

Another object of the present invention is to provide an apparatus for carrying out the image processing method.

The present invention provides an image processing method, wherein a processed image signal Sproc is obtained by carrying out image emphasis processing with Formula (1):

$$Sproc = Sorg + \beta \times (Sorg - Sus) \quad (1)$$

where Sorg represents an original image signal representing an original image, Sus represents an unsharp mask signal of the original image signal Sorg, and β represents an emphasis coefficient, the method comprising the steps of:

i) carrying out a morphology operation, with which an image portion having a contour of a predetermined size is extracted from the original image, on the original image signal Sorg, a specific image signal, which represents a characteristic value with respect to the image portion having the contour, being thereby obtained, ii) calculating a specific image emphasis coefficient in accordance with the level of the specific image signal, iii) detecting an edge signal, which represents a characteristic value with respect to an image edge portion in the original image, iv) adjusting the specific image emphasis coefficient in accordance with the edge signal, a new specific image emphasis coefficient being obtained from the adjustment, and v) employing the new specific image emphasis coefficient as the emphasis coefficient β in Formula (1).

The term "image portion having a contour" as used herein means, for example, an abnormal pattern, such as a calcified pattern. This term does not mean a mere image edge portion, at which the change in image density is sharp, and means the closed image portion, which is surrounded by such an image edge portion.

In the image processing method in accordance with the present invention, the morphology operation should preferably be carried out in accordance with the opening processing or the closing processing, with which the image portion having the contour is extracted selectively. Specifically, a multiply structure element Bi or a single structure element B is set previously in accordance with the size of the image portion, which is to be subjected to the image emphasis processing. The opening processing may then be carried out on the original image signal Sorg in accordance with the second term of Formula (9) (in cases where the multiply structure element Bi is used) or in accordance with Formula (7) (in cases where the single structure element B is used). Alternatively, the closing processing may be carried out on the original image signal Sorg in accordance with the second term of Formula (10) (in cases where the multiply structure element Bi is used) or in accordance with Formula (8) (in cases where the single structure element B is used). Thereafter, the operation for subtracting the signal, which has been obtained from the opening processing, from the original image signal Sorg may be carried out with Formula (13) shown below. Alternatively, the operation for subtracting the original image signal Sorg from the signal, which has been obtained from the closing processing, may be carried out with Formula (14) shown below.

$$S' = Sorg - Sopening \quad (13)$$

$$S' = Sclosing - Sorg \quad (14)$$

In Formulas (13) and (14), Sopening represents the results of the opening processing carried out on the original image signal Sorg, Sclosing represents the results of the closing processing carried out on the original image signal Sorg, and S' represents the specific image signal.

In cases where the original image signal Sorg is of the high image density-high signal level type and the image portion to be emphasized is a calcified pattern, the signal value of the calcified pattern is smaller than the signal values of the surrounding image portions. Therefore, in such cases, the closing processing, in which the minimum value is searched after the searching of the maximum value, may be carried out.

Also, in cases where the original image signal Sorg is of the high luminance-high signal level type and the image portion to be emphasized is a calcified pattern, the signal value of the calcified pattern is larger than the signal values of the surrounding image portions. Therefore, in such cases, the opening processing, in which the maximum value is searched after the searching of the minimum value, may be carried out.

The term "specific image emphasis coefficient" as used herein means the coefficient having a value in accordance with the specific image signal, i.e. the coefficient depending upon the results of the morphology operation carried out on the original image signal Sorg. The specific image emphasis coefficient should preferably be set in accordance with a conversion table, which is shown in, for example, FIG. 2 and is set previously in accordance with the level of the specific image signal. As an aid in carrying out the subsequent operation processing appropriately, it is convenient that the value of the specific image emphasis coefficient is set to fall within the range of 0 to 1.

Before the specific image emphasis coefficient is calculated, an expansion processing for expanding the region, in which the specific image signal representing a value (i.e., a characteristic value) other than zero is located, should preferably be carried out on the specific image signal.

As the expansion processing, the dilation processing, the erosion processing, the unsharp mask processing, or the like, may be employed. Specifically, in cases where the original image signal Sorg is of the high image density-high signal level type and the image portion to be emphasized is a calcified pattern, the erosion processing for searching the minimum value or the unsharp mask processing may be carried out. Also, in cases where the original image signal Sorg is of the high luminance-high signal level type and the image portion to be emphasized is a calcified pattern, the dilation processing for searching the maximum value or the unsharp mask processing may be carried out.

The extent of expansion with the expansion processing should preferably be set such that the image portion, at which the specific image signal represents a value (i.e., a characteristic value) other than zero, may be expanded at least to a size larger than the size (or the spread) of the original specific image portion.

The edge signal may be detected in accordance with a second morphology operation for extracting the image edge portion from the original image. As the second morphology operation, the dilation processing may be carried out with Formula (5), and the original image signal Sorg may then be subtracted from the signal, which has been obtained from the dilation processing, in accordance with Formula (15) shown below. Alternatively, the erosion processing may be carried out with Formula (6), and the signal, which has been obtained from the erosion processing, may then be subtracted from the original image signal Sorg in accordance with Formula (16) shown below. However, the edge signal need not necessarily be detected with the second morphology operation and may be detected with one of various known edge detecting methods.

$$Sedge = Sdilation - Sorg \quad (15)$$

$$Sedge = Sorg - Serosion \quad (16)$$

In Formulas (15) and (16), Sdilation represents the results of the dilation processing carried out on the original image signal Sorg, Serosion represents the results of the erosion processing carried out on the original image signal Sorg, and Sedge represents the edge signal.

As for the edge signal, an edge emphasis coefficient should preferably be calculated in accordance with the level of the edge signal. Thereafter, the specific image emphasis coefficient should preferably be adjusted in accordance with the edge emphasis coefficient.

The term "edge emphasis coefficient" as used herein means the coefficient having a value in accordance with the edge signal, i.e. the coefficient depending upon the edge signal representing the image edge portion in the original image. The edge emphasis coefficient should preferably be set in accordance with a conversion table, which is shown in, for example, FIG. 3 and is set previously in accordance with the level of the edge signal. As an aid in carrying out the subsequent operation processing appropriately, it is convenient that the value of the edge emphasis coefficient is set to fall within the range of 0 to 1.

In cases where the specific image emphasis coefficient is adjusted in accordance with the edge emphasis coefficient, the adjustment should preferably be carried out by multiplying the specific image emphasis coefficient by the edge emphasis coefficient. In particular, in cases where the value of the edge emphasis coefficient is set to fall within the range of 0 to 1, the value of 1 may be set to be the value of the edge emphasis coefficient representing the image edge portion, and the value of 0 may be set to be the value of the edge emphasis coefficient representing the image portions other than the image edge portion. In such cases, when the specific image emphasis coefficient takes a value representing the specific image portion, if the edge emphasis coefficient takes the value of 0 representing the image portions other than the image edge portion, the product of the two coefficients will become equal to 0. Therefore, even if an artifact in the original image is represented by the specific image emphasis coefficient, the problems can be prevented from occurring in that the artifact is emphasized.

Also, in cases where the value of the specific image emphasis coefficient is set to fall within the range of 0 to 1, the value of 1 may be set to be the value of the specific image emphasis coefficient representing the calcified pattern, and the value of 0 may be set to be the value of the specific image emphasis coefficient representing the image portions other than the calcified pattern. In such cases, when the edge emphasis coefficient takes a value representing the image edge portion, if the specific image emphasis coefficient takes the value of 0 representing the image portions other than the calcified pattern, the product of the two coefficients will become equal to 0. Therefore, of the image edge portions represented by the edge emphasis coefficient, the edge portion of a pattern, such as a mammary gland pattern, other than the calcified pattern can be prevented from being emphasized.

The present invention also provides an apparatus for carrying out the image processing method in accordance with the present invention. Specifically, the present invention also provides an image processing apparatus, wherein a processed image signal Sproc is obtained by carrying out image emphasis processing with Formula (1):

$$Sproc = Sorg + \beta \times (Sorg - Sus) \quad (1)$$

where Sorg represents an original image signal representing an original image, Sus represents an unsharp mask signal of the original image signal Sorg, and $\beta$ represents an emphasis coefficient, the apparatus comprising:

i) a morphology operation means for carrying out a morphology operation, with which an image portion having a contour of a predetermined size is extracted from the original image, on the original image signal Sorg, and thereby obtaining a specific image signal, which represents a characteristic value with respect to the image portion having the contour, ii) a conversion table, which represents a specific image emphasis coefficient in accordance with the level of the specific image signal, iii) an edge signal detecting means for detecting an edge signal, which represents a characteristic value with respect to an image edge portion in the original image, iv) an adjustment means for adjusting the specific image emphasis coefficient in accordance with the edge signal, and thereby obtaining a new specific image emphasis coefficient, and v) an image emphasis processing means for carrying out the image emphasis processing with Formula (1) by employing the new specific image emphasis coefficient as the emphasis coefficient $\beta$.

In the image processing apparatus in accordance with the present invention, as in the aforesaid image processing method in accordance with the present invention, the morphology operation should preferably be carried out in accordance with the opening processing or the closing processing. Specifically, a multiply structure element Bi or a single structure element B is set previously. The opening processing may then be carried out on the original image signal Sorg in accordance with the second term of Formula (9) (in cases where the multiply structure element Bi is used) or in accordance with Formula (7) (in cases where the single structure element B is used). Alternatively, the closing processing may be carried out on the original image signal Sorg in accordance with the second term of Formula (10) (in cases where the multiply structure element Bi is used) or in accordance with Formula (8) (in cases where the single structure element B is used). Thereafter, the operation for subtracting the signal, which has been obtained from the opening processing, from the original image signal Sorg may be carried out with Formula (13). Alternatively, the operation for subtracting the original image signal Sorg from the signal, which has been obtained from the closing processing, may be carried out with Formula (14).

In cases where the original image signal Sorg is of the high image density-high signal level type and the image portion to be emphasized is a calcified pattern, the signal value of the calcified pattern is smaller than the signal values of the surrounding image portions. Therefore, in such cases, the closing processing, in which the minimum value is searched after the searching of the maximum value, may be carried out. Also, in cases where the original image signal Sorg is of the high luminance-high signal level type and the image portion to be emphasized is a calcified pattern, the signal value of the calcified pattern is larger than the signal values of the surrounding image portions. Therefore, in such cases, the opening processing, in which the maximum value is searched after the searching of the minimum value, may be carried out.

Also, as shown in, for example, FIG. 2, the conversion table should preferably be set previously in accordance with the level of the specific image signal. As an aid in carrying out the subsequent operation processing appropriately, it is convenient that the value of the specific image emphasis coefficient is set to fall within the range of 0 to 1.

Further, as an aid in carrying out the subsequent operation processing appropriately, the image processing apparatus in accordance with the present invention should preferably be further provided with an expansion processing means for carrying out an expansion processing on the specific image signal such that the region, in which the specific image signal representing a value other than zero is located, may be expanded.

As the expansion processing, the dilation processing, the erosion processing, the unsharp mask processing, or the like, may be employed. Specifically, in cases where the original image signal Sorg is of the high image density-high signal level type and the image portion to be emphasized is a calcified pattern, the erosion processing for searching the minimum value or the unsharp mask processing may be carried out. Also, in cases where the original image signal Sorg is of the high luminance-high signal level type and the image portion to be emphasized is a calcified pattern, the dilation processing for searching the maximum value or the unsharp mask processing may be carried out.

The edge signal detecting means may be constituted of a second morphology operation means, which detects the edge signal in accordance with a second morphology operation for extracting the image edge portion from the original image. As the second morphology operation, the dilation processing may be carried out with Formula (5), and the original image signal Sorg may then be subtracted from the signal, which has been obtained from the dilation processing, in accordance with Formula (15). Alternatively, the erosion processing may be carried out with Formula (6), and the signal, which has been obtained from the erosion processing, may then be subtracted from the original image signal Sorg in accordance with Formula (16). However, the edge signal need not necessarily be detected with the second morphology operation and may be detected with one of various known edge detecting methods.

As for the edge signal, an edge emphasis coefficient should preferably be calculated in accordance with the level of the edge signal. Thereafter, the adjustment means should preferably adjust the specific image emphasis coefficient in accordance with the edge emphasis coefficient.

The edge emphasis coefficient should preferably be set in accordance with the conversion table, which is shown in, for example, FIG. 3 and is set previously in accordance with the level of the edge signal. As an aid in carrying out the subsequent operation processing appropriately, it is convenient that the value of the edge emphasis coefficient is set to fall within the range of 0 to 1.

As the single structure element B which is used when the morphology operation is carried out in accordance with the present invention, by way of example, a bisymmetric element having a form of a square, a rectangle, a circle, an ellipse, a rhombus, or the like, is preferable. This is because, actually, the image signal is distributed in two-dimensional directions.

With the image processing method and apparatus in accordance with the present invention, the morphology operation is carried out on the original image signal Sorg, which represents the original image, and the image portion having the contour of the predetermined size, such as a calcified pattern, which is one of characteristic forms of mammary cancers, is thereby detected. Also, the image edge portion, at which the image density changes sharply, is detected from the original image. The specific image empha-sis coefficient, which serves as an index value representing the image portion, such as the calcified pattern, is adjusted in accordance with the edge signal, which serves as an index value representing an image edge portion. Therefore, when the specific image emphasis coefficient takes a value representing the specific image portion, if the edge signal takes a value representing the image portions other than the image edge portion, specific relationship between the specific image emphasis coefficient and the edge signal can be obtained, and an artifact, which may be represented by the specific image emphasis coefficient, can be prevented from being emphasized.

Also, when the edge signal takes a value representing the image edge portion, if the specific image emphasis coefficient takes a value representing the image portions other than the calcified pattern, specific relationship between the specific image emphasis coefficient and the edge signal can be obtained. Therefore, of the image edge portions represented by the edge signal, the edge portion of a pattern, such as a mammary gland pattern, other than the calcified pattern can be prevented from being emphasized.

As described above, with the image processing method and apparatus in accordance with the present invention, the accuracy, with which the specific image portion to be selectively emphasized, such as a calcified pattern, is separated from the other image portions, can be kept high.

BRIEF DESCRIPTION OF THE DRAWINGS

FIG. 4A is an explanatory view showing how a calcified pattern-dependent emphasis coefficient calculating processing is carried out in the first embodiment of the image processing apparatus in accordance with the present invention, FIG. 4B is an explanatory view showing how an edge signal-dependent emphasis coefficient calculating processing is carried out in the first embodiment of the image processing apparatus in accordance with the present invention, FIG. 4C is an explanatory view showing how an emphasis coefficient is obtained ultimately in the first embodiment of the image processing apparatus in accordance with the present invention, FIGS. 10A-1, 10A-2, and 10A-3 are explanatory views showing how the results of processing are obtained from the processing carried out on an original image signal representing a calcified pattern smaller than a structure element, FIGS. 10B-1, 10B-2, and 10B-3 are explanatory views showing how the results of processing are obtained from the processing carried out on an original image signal representing an image pattern, that is larger than a structure element and contains a flat portion, at which the fluctuation in the signal value is comparatively small and which has a size smaller than the structure element, FIGS. 10C-1938, 10C-2, and 10C-3 are explanatory views showing how the results of processing are obtained from the processing carried out on an original image signal representing an image pattern, that is larger than a structure element and contains a flat portion, at which the fluctuation in the signal value is comparatively small and which has a size sufficiently larger than the structure element.

DESCRIPTION OF THE PREFERRED EMBODIMENTS

The present invention will hereinbelow be described in further detail with reference to the accompanying drawings.

Figure 1:
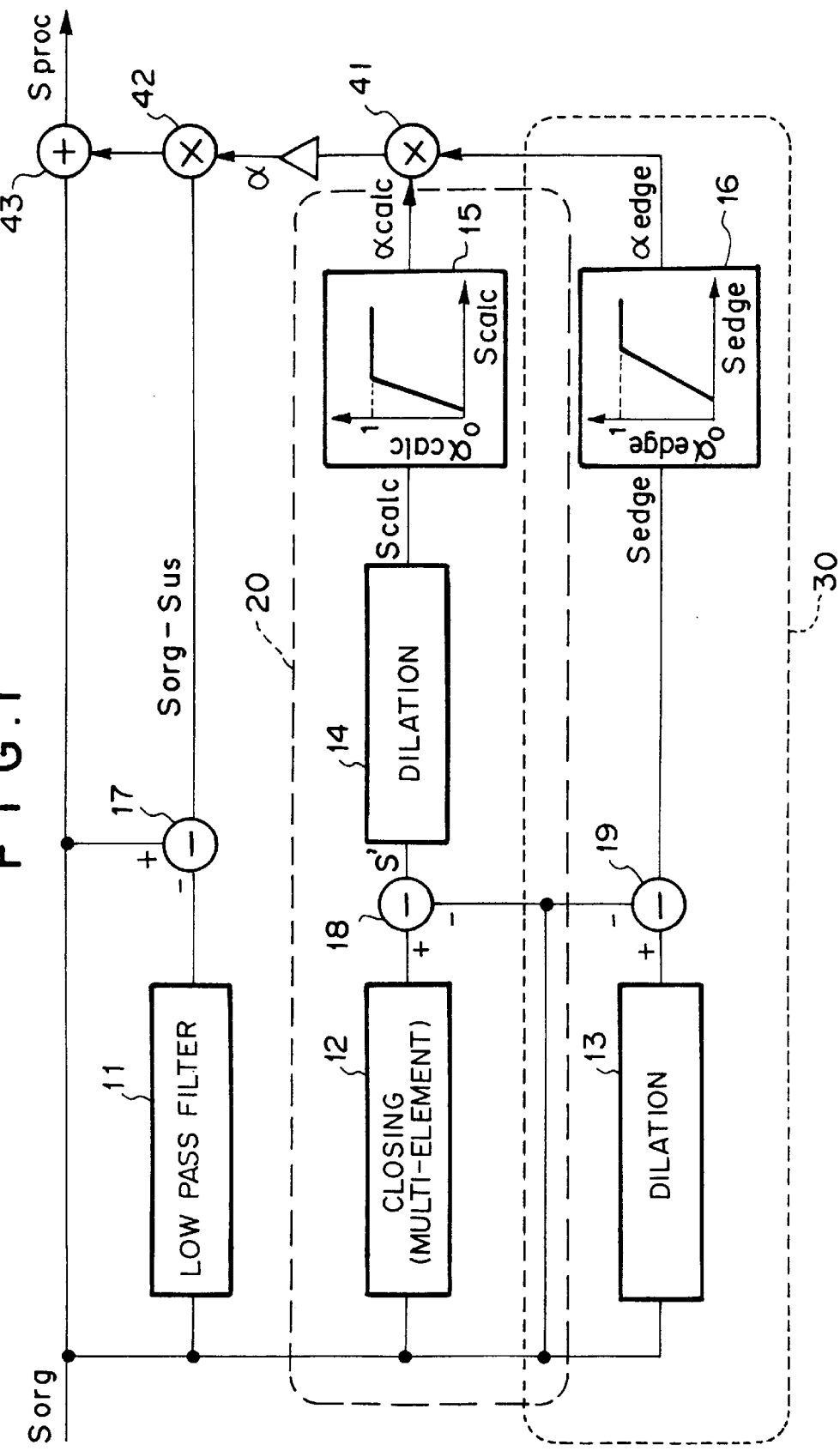
FIG. 1 is a block diagram showing a first embodiment of the image processing apparatus in accordance with the present invention.

FIG. 1 is a block diagram showing a first embodiment of the image processing apparatus in accordance with the present invention. The image processing apparatus illustrated in FIG. 1 carries out image processing on an image signal, which represents an X-ray image, and selectively emphasizes a small calcified pattern, which has a predetermined contour and has an image density value smaller than the image density values of the surrounding image portions.

With reference to FIG. 1, the image processing apparatus comprises a low pass filter 11 for obtaining an unsharp mask signal Sus, which corresponds to super-low frequency, from an original image signal Sorg, which is an image density signal (a high image density-high signal level type of image signal) representing an image. The image processing apparatus also comprises a subtracter 17 for subtracting the unsharp mask signal Sus from the original image signal Sorg and thereby extracting comparatively high frequency components (Sorg−Sus). The image processing apparatus further comprises a calcified pattern-dependent emphasis coefficient calculating means 20 for extracting a calcified pattern signal, which represents a calcified pattern, from the original image signal Sorg and calculating a first emphasis coefficient $\alpha$calc, which is dependent upon the calcified pattern signal. The image processing apparatus still further comprises an edge signal-dependent emphasis coefficient calculating means 30 for extracting an edge signal, which represents an image edge portion, from the original image signal Sorg and calculating a second emphasis coefficient $\alpha$ edge, which is dependent upon the edge signal. The image processing apparatus also comprises a multiplier 41 for multiplying the first emphasis coefficient $\alpha$calc and the second emphasis coefficient $\alpha$edge by each other and thereby calculating a single emphasis coefficient $\alpha$. The image processing apparatus further comprises a multiplier 42 and an adder 43, which carry out the signal processing with Formula (17) shown below by using the original image signal Sorg, the high frequency components (Sorg−Sus), and the emphasis coefficient $\alpha$ and thereby obtain a processed image signal Sproc.

$$Sproc = S\,org + \alpha \times (Sorg - Sus) \qquad (17)$$

Specifically, the calcified pattern-dependent emphasis coefficient calculating means 20 is provided with a first morphology operation means 12 for carrying out a closing processing on the original image signal Sorg. The closing processing is carried out in accordance with the second term in Formula (10) by using a multiply structure element (multi-element) Bi, which corresponds to the size of the calcified pattern, or the like, to be emphasized, and a scale factor $\lambda$. The calcified pattern-dependent emphasis coefficient calculating means 20 is also provided with a subtracter 18 for subtracting the original image signal Sorg from a signal Sclosing, which has been obtained from the closing processing, in accordance with Formula (14) and thereby calculating a calcified pattern signal S'. The calcified pattern-dependent emphasis coefficient calculating means 20 is further provided with an expansion processing means 14 for carrying out a dilation processing on the results of the subtraction, which is carried out by the subtracter 18, and thereby spatially expanding the image portion surrounded by picture elements, at which the calcified pattern signal S' takes values other than 0. The calcified pattern-dependent emphasis coefficient calculating means 20 is still further provided with a first look-up table 15, which has the function shown in FIG. 2 and specifies the relationship between an expansion-processed signal Scalc obtained from the expansion processing and the corresponding value of the first emphasis coefficient $\alpha$calc.

Figure 11A:
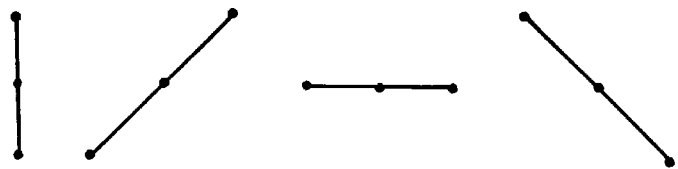
FIG. 11A is an explanatory view showing a linear, three-picture element, four-direction multiply structure element, which is employed in the first embodiment of FIG. 1.

By way of example, as the structure element in the closing processing carried out by the first morphology operation means 12, a multiply structure element Bi shown in FIG. 11A may be employed, in which four linear structure elements B, each being composed of three picture elements, extend in different directions (at intervals of 45 degrees). Also, in the closing processing, the scale factor $\lambda$ may be set to be 1. As the structure element in the dilation processing carried out by the expansion processing means 14, for example, a single structure element B may be employed, which has a square form and has a size of nine picture elements (arrayed in the vertical direction)×nine picture elements (arrayed in the horizontal direction). Also, in the dilation processing, the scale factor $\lambda$ may be set to be 1.

Figure 11B:
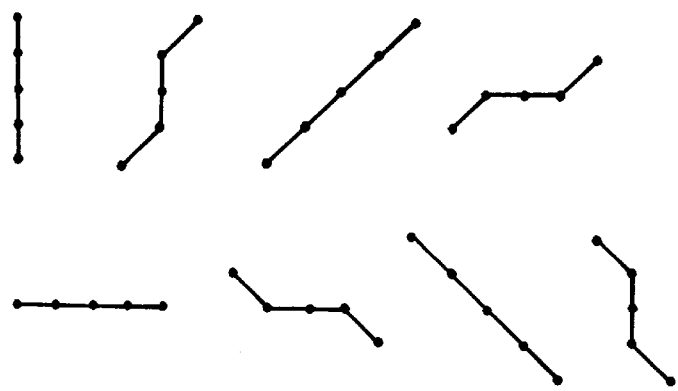
FIG. 11B is an explanatory view showing a five-picture element, eight-direction multiply structure element.
Figure 11C:
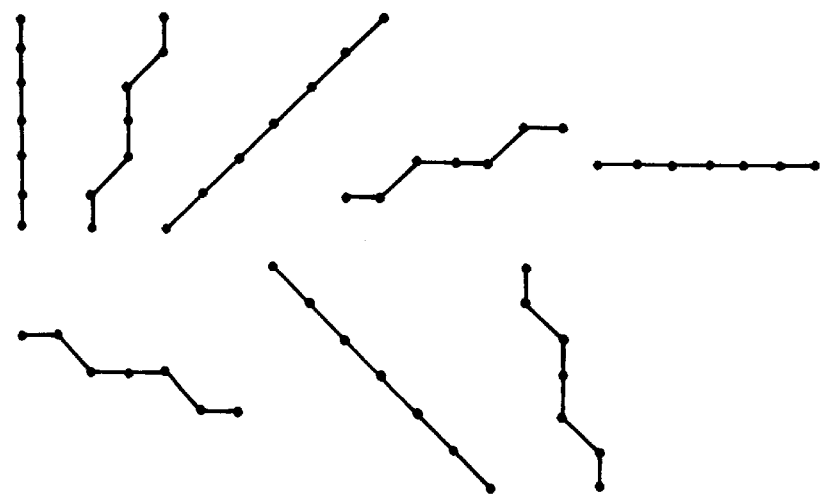
FIG. 11C is an explanatory view showing a seven-picture element, eight-direction multiply structure element.

The number of the picture elements of each of the structure elements B constituting the multiply structure element Bi is not limited to three. For example, as illustrated in FIG. 11B, each structure element B may be composed of five picture elements (arrayed in one of eight different directions). Alternatively, as illustrated in FIG. 11C, each structure element B may be composed of seven picture elements (arrayed in one of eight different directions). Thus the number of the picture elements of each of the structure elements B constituting the multiply structure element Bi may be set in accordance with the size of the calcified pattern to be emphasized. Also, the number of the directions, along which the structure elements B constituting the multiply structure element Bi extend, is not limited to four, and may be eight, sixteen, or the like. However, an appropriate number of directions should be set in accordance with the number of the picture elements of each structure element B.

Specifically, in cases where each structure element is composed of three picture elements, the number of the directions, along which the structure elements extend, is limited to four, and it is meaningless to set eight directions, or the like. Therefore, in cases where each structure element is composed of three picture elements, the number of the directions, along which the structure elements extend, should preferably be set to be four. Also, in cases where each structure element is composed of five or seven picture elements, the number of the directions, along which the structure elements extend, should preferably be set to be eight. In FIGS. 11B and 11C, since the picture elements arrayed in a square, lattice-like form are processed, the structure element extending in the oblique direction is not set to be strictly linear.

The edge signal-dependent emphasis coefficient calculating means 30 is provided with a second morphology operation means 13 for carrying out a dilation processing, which yields a signal Sdilation representing a characteristic signal value at an image edge portion in the X-ray image. The edge signal-dependent emphasis coefficient calculating means 30 is also provided with a subtracter 19 for subtracting the original image signal Sorg from the signal Sdilation in accordance with Formula (15) and thereby obtaining an edge signal Sedge. The edge signal-dependent emphasis coefficient calculating means 30 is further provided with a second look-up table 16, which has the function shown in FIG. 3 and specifies the relationship between the edge signal Sedge obtained from the subtraction and the corresponding value of the second emphasis coefficient αedge.

As the structure element in the dilation processing carried out by the second morphology operation means 13, for example, a single structure element B may be employed, which has a square form and has a size of five picture elements (arrayed in the vertical direction)×five picture elements (arrayed in the horizontal direction). Also, in the dilation processing, the scale factor λ may be set to be 1.

How this embodiment operates will be described herein-below.

Firstly, an X-ray image of the mamma of a patient serving as an object is recorded on a sheet of X-ray film and is photoelectrically read out from the X-ray film by using an image read-out means (not shown). An original image signal Sorg representing the X-ray image is thereby obtained.

The original image signal Sorg is then fed into the image processing apparatus.

The original image signal Sorg is fed into the low pass filter 11. The low pass filter 11 sets an unsharp mask, which may be constituted of a picture element matrix having a size of, for example, 3 columns×3 rows. The low pass filter 11 thereby calculates the unsharp mask signal Sus from the original image signal Sorg in accordance with Formula (2) shown below, wherein N=3.

$$Sus = (\Sigma\Sigma Sorg)/N^2 \tag{2}$$

wherein ΣΣSorg represents the sum of the image signal values representing the picture elements located within the unsharp mask.

In Formula (2), the simple mean value of the values of the picture elements located within the unsharp mask is employed as the unsharp mask signal Sus. Alternatively, the unsharp mask signal Sus may be obtained by weighting the values of the picture elements located within the unsharp mask in accordance with the distances of the picture elements from the middle picture element in the unsharp mask.

Thereafter, the subtracter 17 subtracts the unsharp mask signal Sus, which has been obtained from the low pass filter 11, from the original image signal Sorg. The high frequency components (Sorg−Sus) of the original image signal Sorg are thereby obtained from the subtracter 17.

Also, simultaneously with the operations of the low pass filter 11 and the subtracter 17, the calcified pattern-dependent emphasis coefficient calculating means 20 calculates the first emphasis coefficient αcalc from the original image signal Sorg. Further, the edge signal-dependent emphasis coefficient calculating means 30 calculates the second emphasis coefficient αedge from the original image signal Sorg.

Specifically, in the calcified pattern-dependent emphasis coefficient calculating means 20, the first morphology operation means 12 carries out the closing processing on the received original image signal Sorg by using the linear, three-picture element, four-direction multiply structure element Bi.

By way of example, as indicated by a profile illustrated at the top stage in FIG. 4A, the original image signal Sorg may contain a mammary gland pattern and a calcified pattern. Also, by way of example, the size of the calcified pattern may be larger than the total size of three picture elements. In such cases, as indicated by a profile illustrated at the second stage in FIG. 4A, in the image signal Sclosing obtained from the closing processing, the signal profile of the mammary gland pattern larger than the multiply structure element Bi is kept to be the same as that in the original image signal Sorg. As for the calcified pattern, the profile of its center portion, which is spatially narrower than the multiply structure element Bi, is erased in the image signal Sclosing. Also, in the image signal Sclosing, the profile of the slope area of the calcified pattern, which slope area is spatially wider than the multiply structure element Bi, is kept to be the same as that in the original image signal Sorg.

Thereafter, the subtracter 18 subtracts the original image signal Sorg from the image signal Sclosing, which has been obtained from the closing operation, and the calcified pattern signal S' (=Sclosing−Sorg) is thereby obtained. As indicated by a profile illustrated at the third stage in FIG. 4A, the calcified pattern signal S' represents a characteristic value, which is other than zero, with respect to only the center portion of the calcified pattern, which center portion is spatially narrower than the multiply structure element Bi. Therefore, only the center portion of the calcified pattern, which center portion is spatially narrower than the multiply structure element Bi, can be detected in accordance with the difference in the signal values of the calcified pattern signal S'.

In FIG. 4A, a calcified pattern, the entire size of which is spatially narrower than the multiply structure element Bi, is not shown. Such a calcified pattern can also be detected in the same manner as that described above. The signal value of the portions other than the thus detected portion is equal to zero.

Heretofore, the emphasis coefficient depending upon the calcified pattern signal S' has been applied to Formula (17). As a result, with respect to the image portion corresponding to the region spatially narrower than the multiply structure element Bi, the emphasis coefficient becomes large, and therefore the degree of emphasis becomes high. However, the problems occur in that no emphasis is carried out with respect to the portion corresponding to the aforesaid slope area in the calcified pattern and, as a result, the shape and form of the calcified pattern cannot be kept.

Such that the problems described above may be eliminated, in this embodiment, the expansion processing means 14 carries out the dilation processing on the calcified pattern signal S' by using the single structure element B, which has a square form and has a size of nine picture elements (arrayed in the vertical direction)×nine picture elements (arrayed in the horizontal direction). As indicated by the profile of the expansion-processed signal Scalc, which is illustrated at the fourth stage in FIG. 4A, the expansion processing means 14 thereby spatially expands the calcified pattern signal S'.

The region, in which the expansion-processed signal Scalc obtained from the expansion processing takes a value other than zero, can be set to be a predetermined spread by changing the size of the structure element. In this embodiment, the structure element is set to have the aforesaid size, and the spread of the region, in which the expansion-processed signal Scalc takes a value other than zero, is thereby set to be approximately equal to the spatial spread of the calcified pattern represented by the original image signal Sorg. However, the spread of the region, in which the expansion-processed signal Scalc takes a value other than zero, need not necessarily be set to be equal to the spatial spread of the calcified pattern represented by the original image signal Sorg. The spread of the region, in which the expansion-processed signal Scalc takes a value other than zero, may be set to be equal to or larger than the spatial spread of the calcified pattern represented by the original image signal Sorg.

As indicated by a profile illustrated at the fifth stage in FIG. 4A, the expansion-processed signal Scalc having thus been obtained is converted into the first emphasis coefficient αcalc, which corresponds to the expansion-processed signal Scalc, by the first look-up table 15. With the first look-up table 15, the first emphasis coefficient αcalc takes a value falling within the range of 0 to 1 in accordance with the value of the expansion-processed signal Scalc. When the value of the expansion-processed signal Scalc is 0, the first emphasis coefficient αcalc takes a value of 0.

In the edge signal-dependent emphasis coefficient calculating means 30, the second morphology operation means 13 carries out the dilation processing on the received original image signal Sorg by using the single structure element B, which has a square form and has a size of five picture elements (arrayed in the vertical direction)×five picture elements (arrayed in the horizontal direction).

In this example, as indicated by a profile illustrated at the top stage in FIG. 4B (which profile is the same as the profile illustrated at the top stage in FIG. 4A), the original image signal Sorg contains the mammary gland pattern and the calcified pattern. In such cases, as indicated by a profile illustrated at the second stage in FIG. 4B, the image signal Sdilation, which is obtained from the dilation processing carried out by the second morphology operation means 13, has the flat signal value profile, except for a portion of the mammary gland pattern.

Thereafter, the subtracter 19 subtracts the original image signal Sorg from the image signal Sdilation, which has been obtained from the dilation operation, and the edge signal Sedge (=Sdilation−Sorg) is thereby obtained. As indicated by a profile illustrated at the third stage in FIG. 4B, in the edge signal Sedge, the signal value rises sharply at the image edge portion of the calcified pattern and at the image edge portion of the mammary gland pattern. The signal value of the portions other than the signal value rising portions is equal to zero.

As indicated by a profile illustrated at the fourth stage in FIG. 4B, the edge signal Sedge having thus been obtained is converted into the second emphasis coefficient αedge, which corresponds to the edge signal Sedge, by the second look-up table 16.

In this embodiment, as indicated by the profile illustrated at the fifth stage in FIG. 4A, the region, in which the first emphasis coefficient αcalc takes a value other than zero, has the same spatial spread as the spatial spread of the calcified pattern represented by the original image signal Sorg. However, as described above, this is a mere coincidence due to the selection of the structure element. The expansion processing means 14 may expand the calcified pattern signal S' such that the region, in which the first emphasis coefficient αcalc takes a value other than zero, may become wider than the spatial spread of the calcified pattern represented by the original image signal Sorg.

From the processing carried out in the manner described above, as indicated by the profile illustrated at the fifth stage in FIG. 4A, the first emphasis coefficient αcalc is obtained so as to take a value falling within the range of 0 to 1. Also, as indicated by the profile illustrated at the fourth stage in FIG. 4B, the second emphasis coefficient αedge is obtained so as to take a value falling within the range of 0 to 1. The information representing the first emphasis coefficient αcalc and the information representing the second emphasis coefficient α edge are fed into the multiplier 41. As indicated by the profile illustrated at a lower stage in FIG. 4C, the two coefficients are multiplied by each other, and a single emphasis coefficient α is thereby calculated.

As a result, as for an image portion, at which at least either one of the first emphasis coefficient αcalc and the second emphasis coefficient αedge takes a value of 0, the product of the two coefficients becomes equal to 0. Only for the image portion, at which both of the first emphasis coefficient αcalc and the second emphasis coefficient αedge take values other than 0, the product of the two coefficients takes a value other than 0.

Specifically, with the conventional method, in cases where the edge signal-dependent emphasis coefficient calculating means 30 is used alone, the emphasis coefficient takes a value other than 0 at the image edge portion of the calcified pattern, which is to be emphasized, and at the image edge portion of the mammary gland pattern, which is not to be emphasized. Also, in cases where the calcified pattern-dependent emphasis coefficient calculating means 20 is used alone, as for a calcified pattern, that is larger than the structure element and contains the flat portion, at which the fluctuation in the signal value is comparatively small and which has a size smaller than the structure element, the emphasis coefficient takes a value other than 0 with respect to only the portion at which the signal value fluctuates in the region smaller than the structure element (i.e., the portion corresponding to the center area of the calcified pattern).

On the other hand, in this embodiment of the image processing apparatus in accordance with the present invention, the ultimately obtained emphasis coefficient α takes a value other than 0 at the contour portion, which corresponds to the image edge portion of the calcified pattern, and at the region inward from the contour portion (and including the slope area of the calcified pattern). Also, the emphasis coefficient α takes a value of 0 at image portions, such as the image edge portion of the mammary gland pattern, which are not to be emphasized.

The multiplier 42 and the adder 43 carry out the multiplication and the addition in accordance with Formula (17) by using the emphasis coefficient α which takes the values described above, the original image signal Sorg, and the high frequency components (Sorg−Sus). The processed image signal Sproc is thereby obtained.

As described above, the emphasis coefficient α for emphasizing the high frequency components (Sorg−Sus) in Formula (17) takes a value other than 0 at the contour portion, which corresponds to the image edge portion of the calcified pattern, and at the region inward from the contour portion. Therefore, only the contour portion of the calcified pattern and the region inward from the contour portion can be emphasized. Also, the degree of separation of the calcified pattern can be kept higher than with the conventional emphasis processing methods and apparatuses.

As indicated at the lower stage in FIG. 4C, the calculation of the emphasis coefficient α contains the multiplication by a fixed number (Const.). The multiplication is carried out by an amplifier (provided with no reference number), which is located at the stage next to the multiplier 41 in FIG. 1. In cases where the amplifier is not provided, the value of Const. may be set to be 1.

Figure 5:
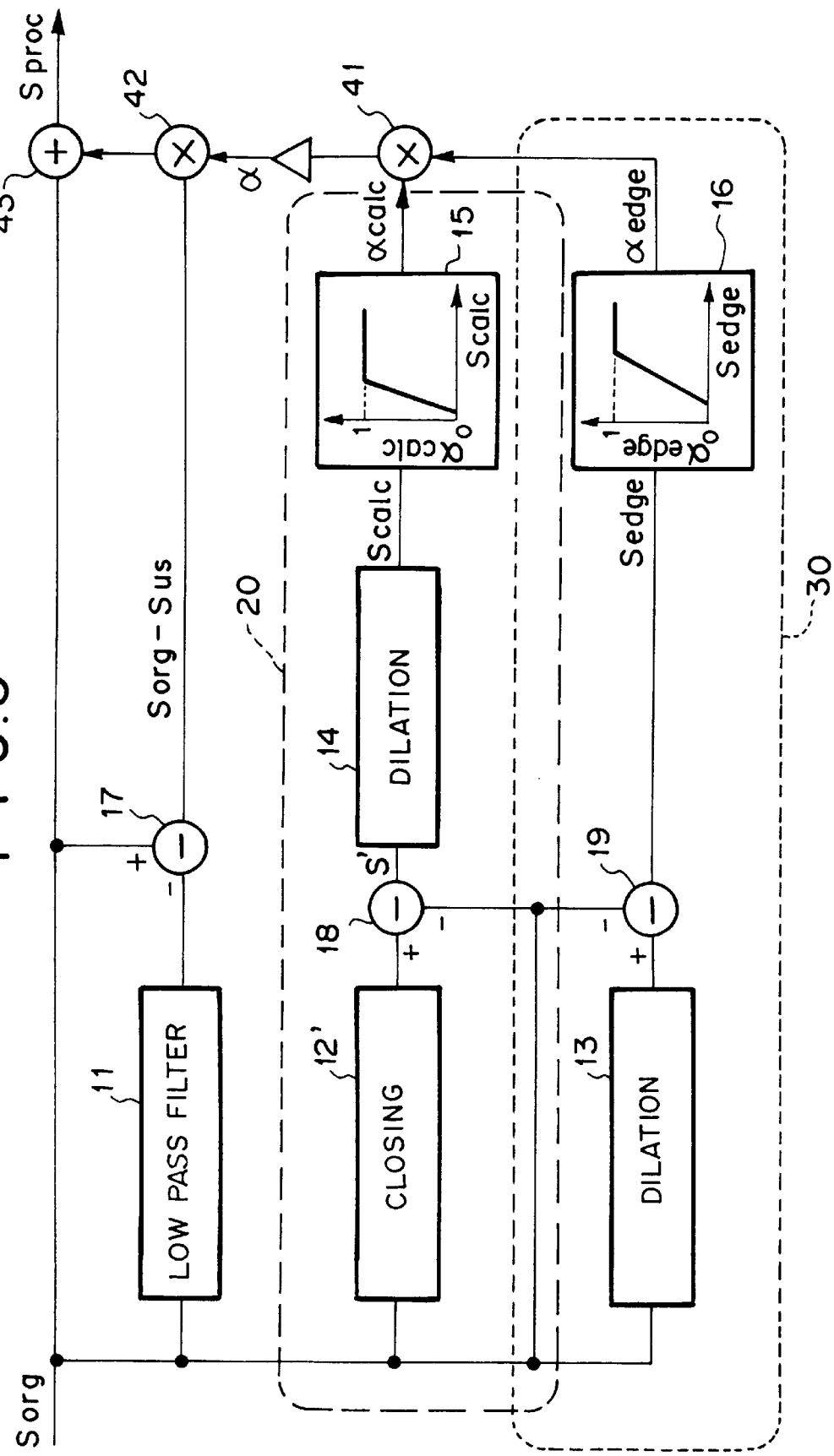
FIG. 5 is a block diagram showing a second embodiment of the image processing apparatus in accordance with the present invention.

The image processing apparatus in accordance with the present invention may be embodied in various other ways. For example, in the embodiment of FIG. 1, the first morphology operation means 12 is employed, which carries out the closing processing by using the linear, three picture element, four-direction multiply structure element. Alternatively, as illustrated in FIG. 5, a first morphology operation means 12' maybe employed, which carries out the closing processing by using a single structure element, that has a square form and has a size of three picture elements (arrayed in the vertical direction)×three picture elements (arrayed in the horizontal direction). In such cases, the same effects as those with the embodiment of FIG. 1 can be obtained.

Figure 6:
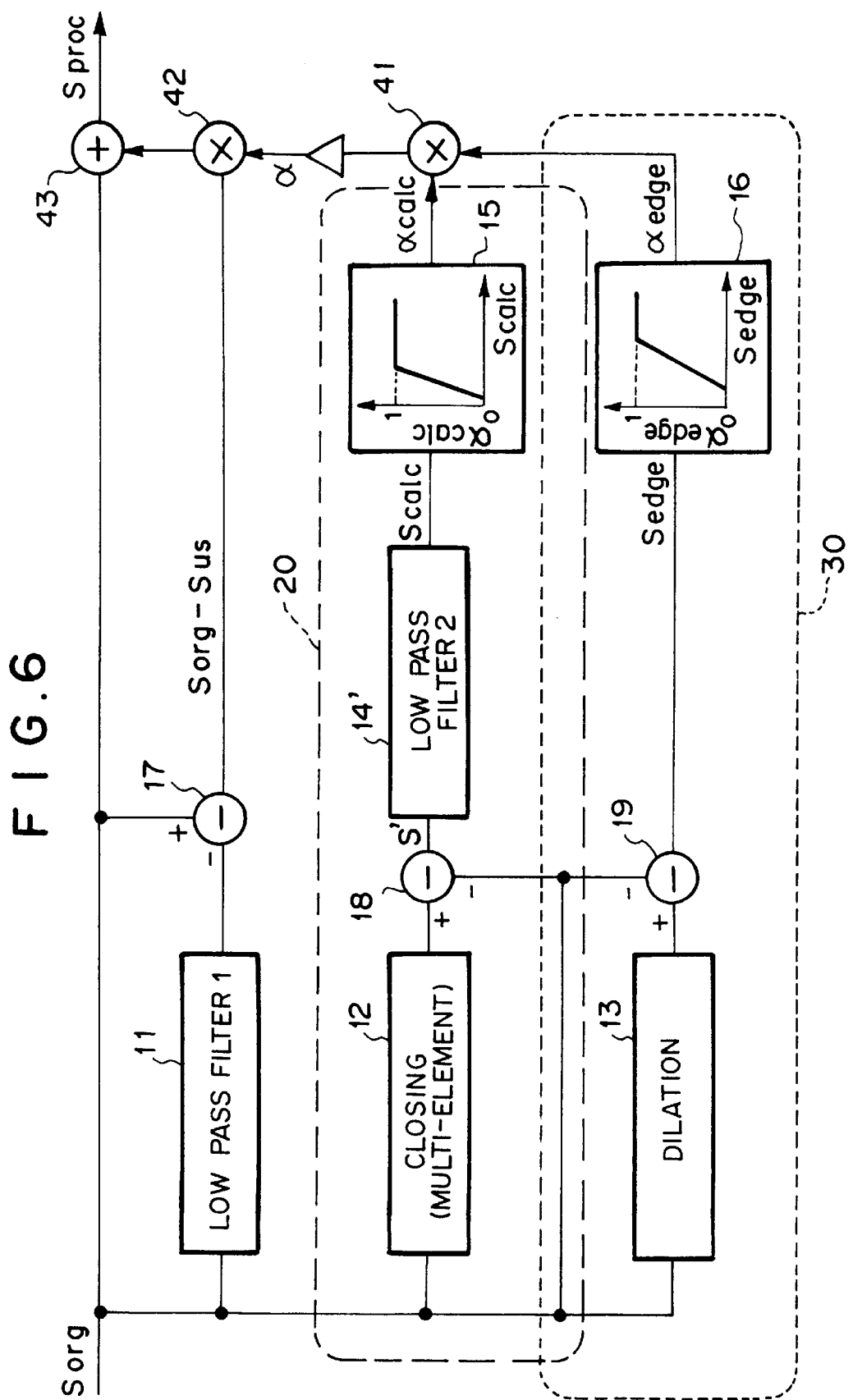
FIG. 6 is a block diagram showing a third embodiment of the image processing apparatus in accordance with the present invention.

Also, as illustrated in FIG. 6, in lieu of the expansion processing means 14 for carrying out the dilation processing, an expansion processing means 14' for carrying out the unsharp mask processing may be employed.

Figure 7:
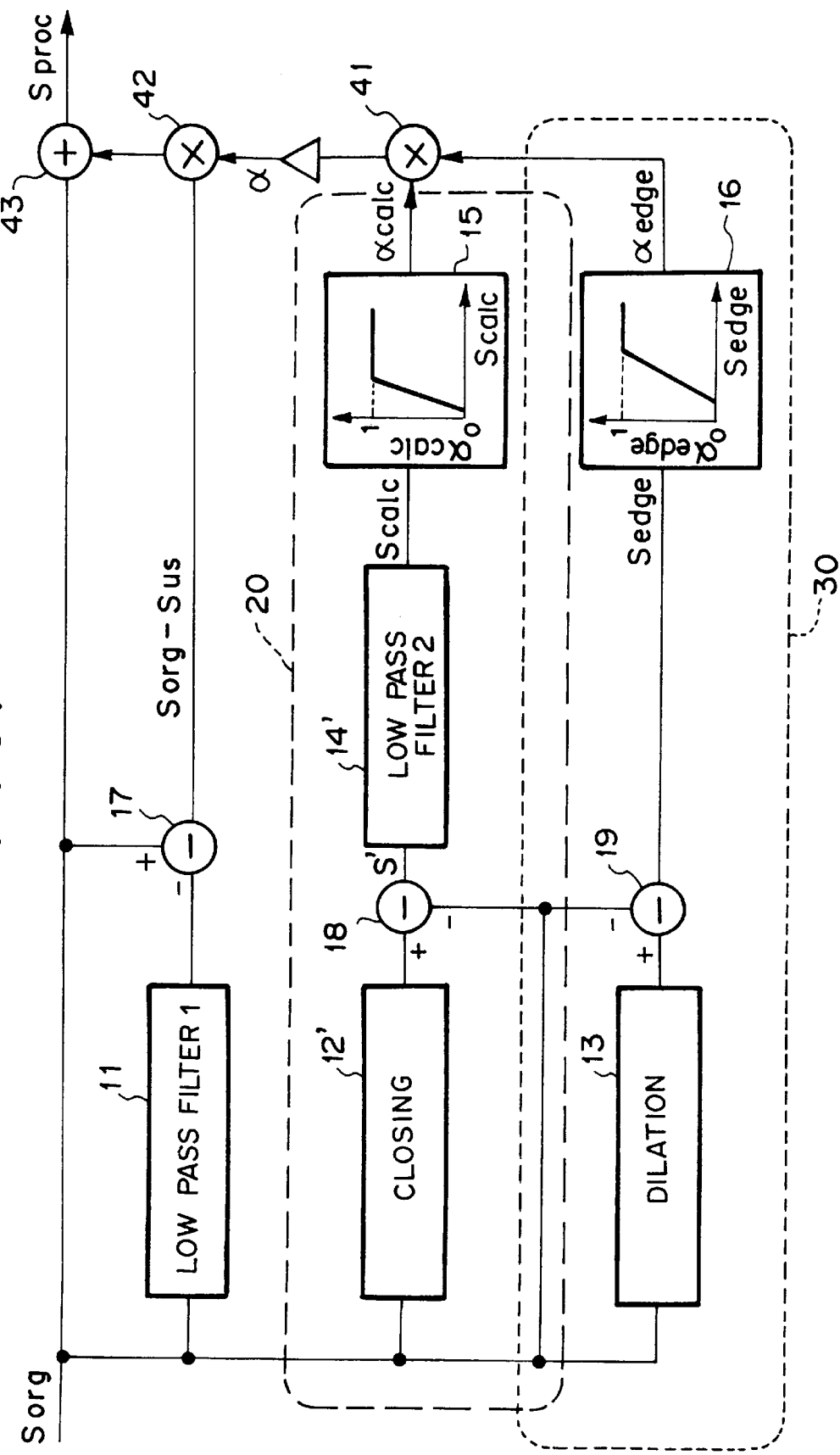
FIG. 7 is a block diagram showing a fourth embodiment of the image processing apparatus in accordance with the present invention.
Figure 8A:
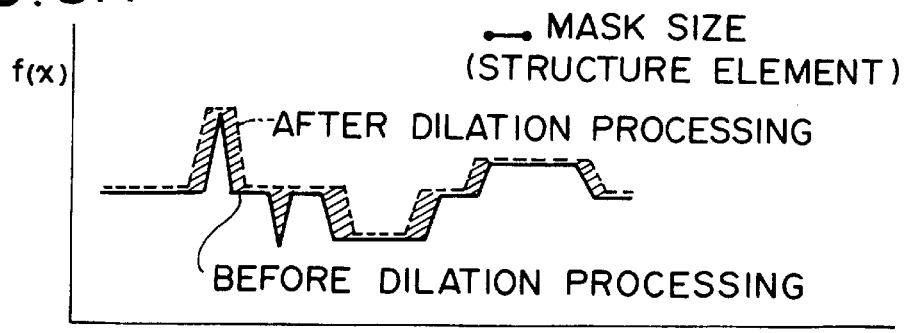
FIG. 8A is a graph showing how a dilation processing, which is one of fundamental morphology operations, is carried out.
Figure 8B:
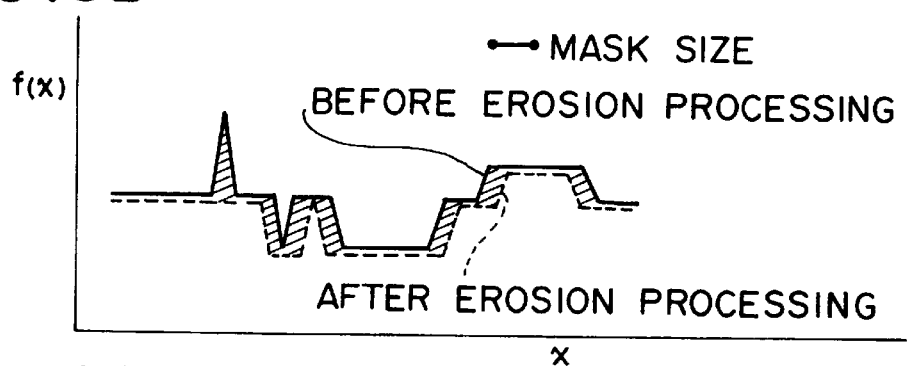
FIG. 8B is a graph showing how an erosion processing, which is one of fundamental morphology operations, is carried out.
Figure 8C:
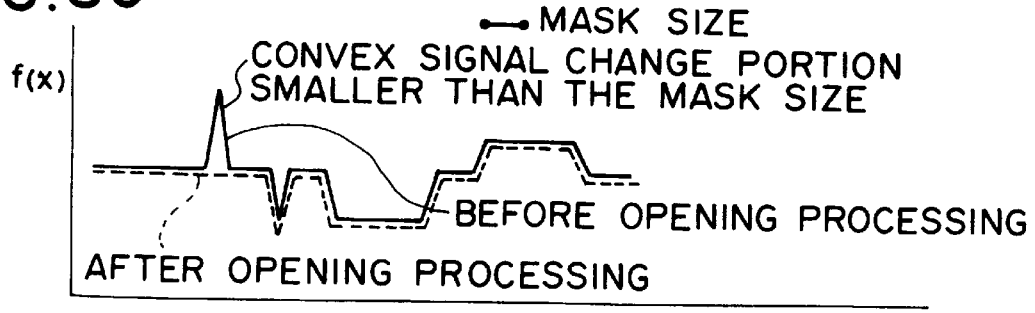
FIG. 8C is a graph showing how an opening processing, which is one of fundamental morphology operations, is carried out.
Figure 8D:
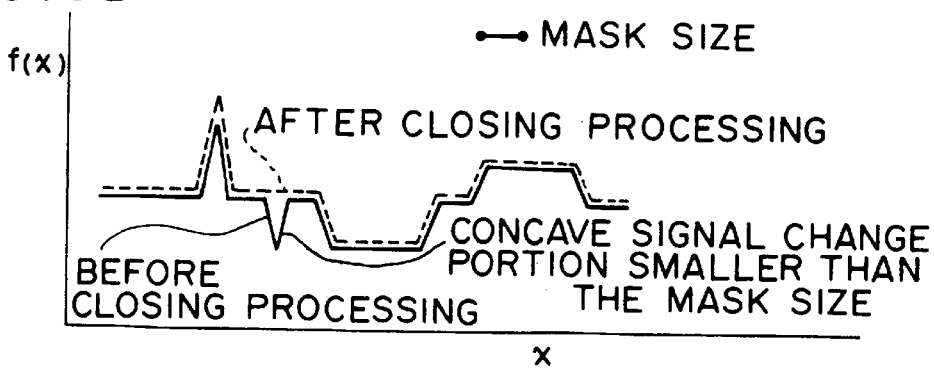
FIG. 8D is a graph showing how a closing processing, which is one of fundamental morphology operations, is carried out.
Figure 9:
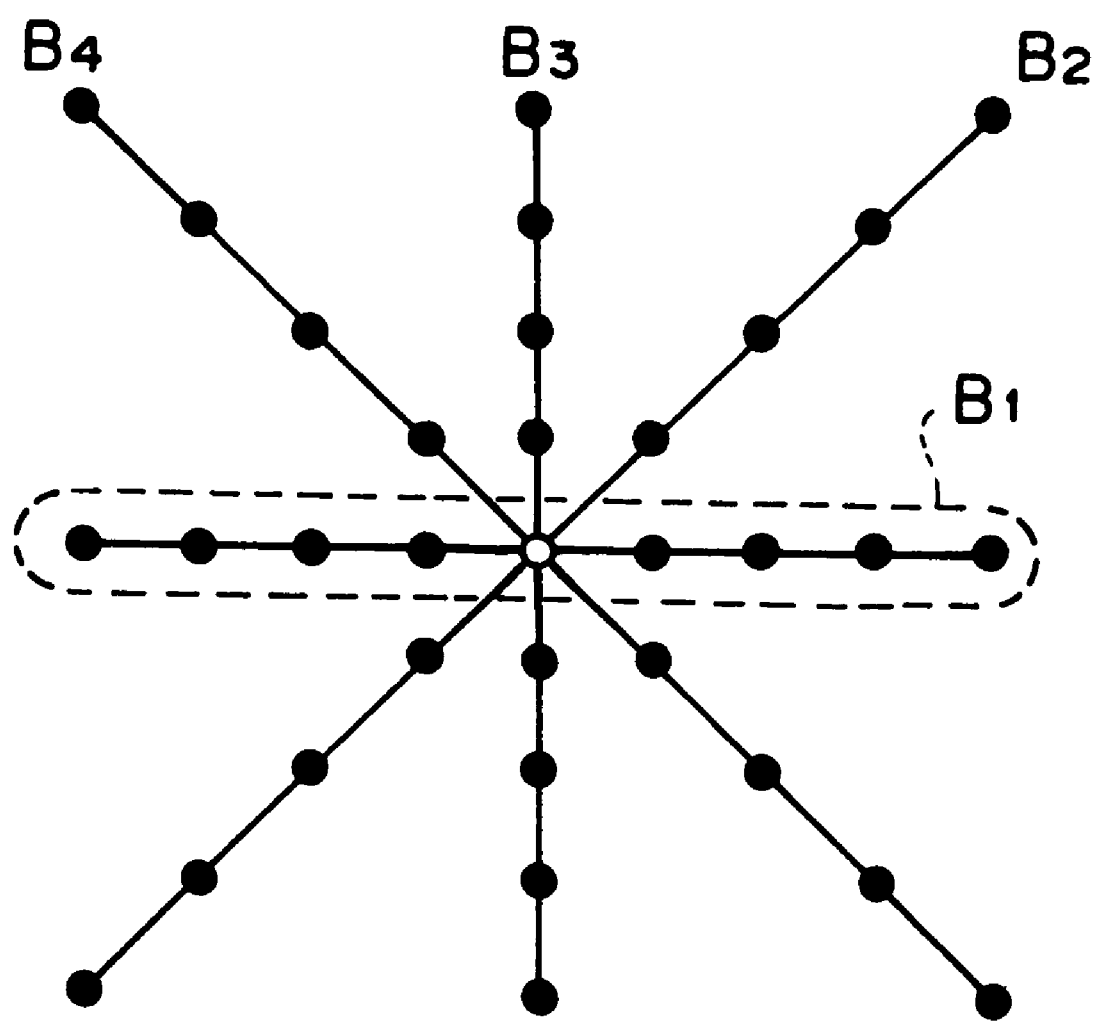
FIG. 9 is an explanatory view showing a multiply structure element Bi (where i=1, 2, ..., M; M=4) employed in a morphology filter.

Further, as illustrated in FIG. 7, it is possible to employ the combination of the first morphology operation means 12', which carries out the closing processing by using the single structure element, that has a square form and has a size of three picture elements (arrayed in the vertical direction)×three picture elements (arrayed in the horizontal direction), and the expansion processing means 14' for carrying out the unsharp mask processing.

In each of the embodiments described above, the processed image signal Sproc is obtained by setting the unsharp mask size of the low pass filter 11 to be the size of three picture elements (arrayed in the vertical direction)×three picture elements (arrayed in the horizontal direction) and emphasizing only the calcified pattern. After the processed image signal Sproc has been obtained, a low frequency emphasis processing (the ordinary image density-dependent emphasis processing) may be carried out by using an unsharp mask having a size larger than the size of three picture elements (arrayed in the vertical direction)×three picture elements (arrayed in the horizontal direction). In such cases, a tumor pattern, which is one of characteristic forms of mammary cancers and in which the gradient lines of the image density values centralize upon the center point of the pattern, can also be emphasized. In this manner, the tumor pattern and the calcified pattern can be emphasized. Therefore, the image processing can be carried out such that a visible image having good image quality can be reproduced and used as an effective tool in, particularly, the accurate and efficient diagnosis of an illness.

Figure 2:
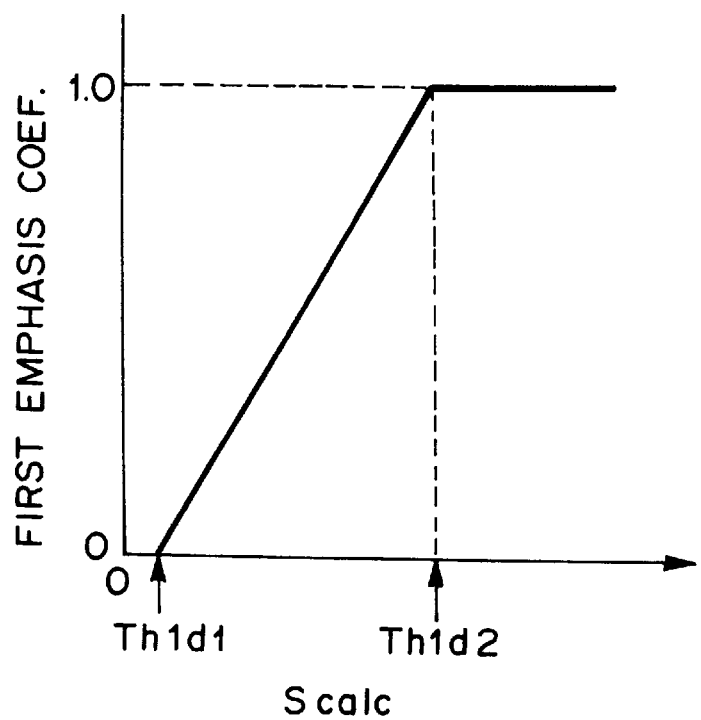
FIG. 2 is a graph showing a function representing a first look-up table.
Figure 3:
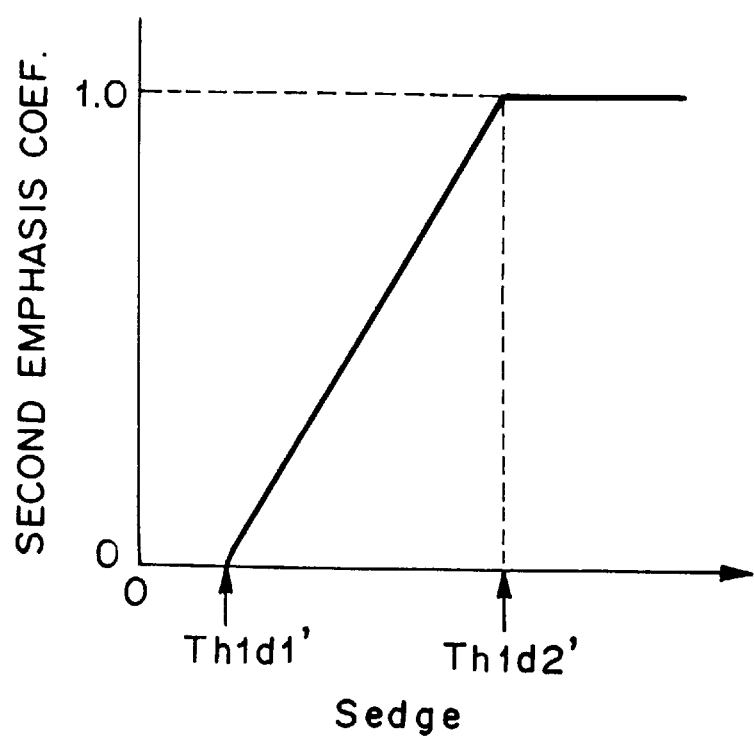
FIG. 3 is a graph showing a function representing a second look-up table.

As illustrated in FIG. 2, threshold values Thld1 and Thld2 are set in the first look-up table 15. Also, as illustrated in FIG. 3, threshold values Thld1' and Thld2' are set in the second look-up table 16. These threshold values are obtained experimentally. Alternatively, the threshold values may be set in accordance with the results of analysis of a histogram of the signal fed into each look-up table. For example, the maximum values of the histograms of the signals fed into the two look-up tables may be taken as the threshold values Thld1 and Thld1', and the minimum values of the histograms may be taken as the threshold values Thld2 and Thld2'.

What is claimed is:

1. An image processing method, wherein a processed image signal Sproc is obtained by carrying out image emphasis processing with Formula (1):

$$Sproc = Sorg + \beta \times (Sorg - Sus) \quad (1)$$

where Sorg represents an original image signal representing an original image, Sus represents an unsharp mask signal of the original image signal Sorg, and β represents an emphasis coefficient, the method comprising the steps of:
  i) carrying out a morphology operation, with which an image portion having a contour of a predetermined size is extracted from the original image, on the original image signal Sorg, a specific image signal, which represents a characteristic value with respect to the image portion having said contour, being thereby obtained,
  ii) calculating a specific image emphasis coefficient in accordance with the level of said specific image signal,
  iii) detecting an edge signal, which represents a characteristic value with respect to an image edge portion in the original image,
  iv) adjusting said specific image emphasis coefficient in accordance with said edge signal, a new specific image emphasis coefficient being obtained from said adjustment, and
  v) employing said new specific image emphasis coefficient as the emphasis coefficient β in Formula (1).

2. A method as defined in claim 1 wherein said morphology operation is carried out in accordance with an opening processing or a closing processing.

3. A method as defined in claim 1 wherein said specific image emphasis coefficient is calculated in accordance with a conversion table, which is set previously in accordance with the level of said specific image signal.

4. A method as defined in claim 1 wherein, before said specific image emphasis coefficient is calculated, an expansion processing for expanding the region, in which said specific image signal representing a value other than zero is located, is carried out on said specific image signal.

5. A method as defined in claim 1 wherein said edge signal is detected in accordance with a second morphology operation for extracting said image edge portion from the original image.

6. A method as defined in claim 5 wherein said second morphology operation is carried out in accordance with a dilation processing or an erosion processing.

7. A method as defined in claim 1 wherein an edge emphasis coefficient in accordance with the level of said edge signal is calculated, said specific image emphasis coefficient is adjusted in accordance with said edge emphasis coefficient.

8. A method as defined in claim 7 wherein said edge emphasis coefficient is calculated in accordance with a second conversion table, which is set previously in accordance with the level of said edge signal.

9. An image processing apparatus, wherein a processed image signal Sproc is obtained by carrying out image emphasis processing with Formula (1):

$$Sproc = Sorg + \beta \times (Sorg - Sus) \quad (1)$$

where Sorg represents an original image signal representing an original image, Sus represents an unsharp mask signal of the original image signal Sorg, and β represents an emphasis coefficient, the apparatus comprising:
i) a morphology operation means for carrying out a morphology operation, with which an image portion having a contour of a predetermined size is extracted from the original image, on the original image signal Sorg, and thereby obtaining a specific image signal, which represents a characteristic value with respect to the image portion having said contour,
ii) a conversion table, which represents a specific image emphasis coefficient in accordance with the level of said specific image signal,
iii) an edge signal detecting means for detecting an edge signal, which represents a characteristic value with respect to an image edge portion in the original image,
iv) an adjustment means for adjusting said specific image emphasis coefficient in accordance with said edge signal, and thereby obtaining a new specific image emphasis coefficient, and
v) an image emphasis processing means for carrying out the image emphasis processing with Formula (1) by employing said new specific image emphasis coefficient as the emphasis coefficient β.

10. An apparatus as defined in claim 9 wherein said morphology operation in said morphology operation means is carried out in accordance with an opening processing or a closing processing.

11. An apparatus as defined in claim 9 wherein the apparatus further comprises an expansion processing means for carrying out an expansion processing on said specific image signal such that the region, in which said specific image signal representing a value other than zero is located, may be expanded.

12. An apparatus as defined in claim 9 wherein said edge signal detecting means is constituted of a second morphology operation means, which detects said edge signal in accordance with a second morphology operation for extracting said image edge portion from the original image.

13. An apparatus as defined in claim 12 wherein said second morphology operation in said second morphology operation means is carried out in accordance with a dilation processing or an erosion processing.

14. An apparatus as defined in claim 9 wherein the apparatus further comprises a second conversion table, in which an edge emphasis coefficient in accordance with the level of said edge signal is set previously, and said adjustment means adjusts said specific image emphasis coefficient in accordance with said edge emphasis coefficient.

* * * * *